July 14, 1959 F. W. FIELDING Re. 24,667

ARTICLE CARRIER

Original Filed Oct. 17, 1955 3 Sheets-Sheet 1

INVENTOR:
Francis W. Fielding,
BY
Blair Freeman & Molinare
ATTORNEYS.

July 14, 1959 F. W. FIELDING Re. 24,667

ARTICLE CARRIER

Original Filed Oct. 17, 1955 3 Sheets-Sheet 2

INVENTOR:
Francis W. Fielding,
BY
Brin Freeman & McIlwaine
ATTORNEYS.

ARTICLE CARRIER

Original Filed Oct. 17, 1955 3 Sheets-Sheet 3

INVENTOR:
Francis W. Fielding,
BY
Orin Freeman & Milnar
ATTORNEYS.

United States Patent Office

Re. 24,667
Reissued July 14, 1959

24,667

ARTICLE CARRIER

Francis W. Fielding, New Orleans, La., assignor to Lengsfield Brothers, Inc., New Orleans, La., a corporation of Louisiana Original No. 2,849,111, dated August 26, 1958, Serial No. 540,981, October 17, 1955. Application for reissue November 3, 1958, Serial No. 774,797

6 Claims. (Cl. 206—65)

Matter enclosed in heavy brackets [ ] appears in the original patent but forms no part of this reissue specification; matter printed in italics indicates the additions made by reissue.

This invention relates to an article carrier and more particularly to a container for packaging and carrying articles such as cylindrical cans or the like.

Article carriers or cartons of this type must be relatively inexpensive, must be made so that they can be folded flat for shipment and storage and must be easy to fill. One of the problems encountered in designing satisfactory carriers is that of holding the articles securely in the carrier against accidental removal while permitting relatively easy removal of the articles when desired. Carriers as heretofore constructed have utilized cut-outs or relatively complex flap structures for this purpose which are expensive to form or are wasteful of material and which are difficult to handle in filling the carriers.

It is one of the objects of the present invention to provide an article carrier which is extremely economical to manufacture, easy to fill and which holds the article securely in place when it is filled.

According to one feature of the invention, no cutouts or complicated flaps requiring gluing or other fastenings are employed to hold the articles in the carrier. According to another feature the carrier is formed of a simple sheet of paper board or the like folded and glued with a single seam preferably falling at the center of the top or bottom panel to define an open ended container.

Another object is to provide an article carrier in which the articles are held in at the ends of the container by simple foldable flaps and webs at the ends of certain of the container panels which are held in folded position by engagement with the articles in the container.

A further object is to provide an article carrier which is easily formed with or without handles.

A still further object is to provide an article carrier which is made in the form of a simple rectangular container to receive single or multiple rows of articles or in the form of a container with a central partition to receive separated double rows of articles.

When a handle is desired it may easily be formed by cutting out handle portions at the ends of the sheet in the case of a simple rectangular container or by laminating handle portions intermediate the edges of the top panel and at the end of the central partition in containers employing a central partition.

The above and other objects and features of the invention will be more readily apparent from the following description when read in connection with the accompanying drawings, in which.

Figure 6:
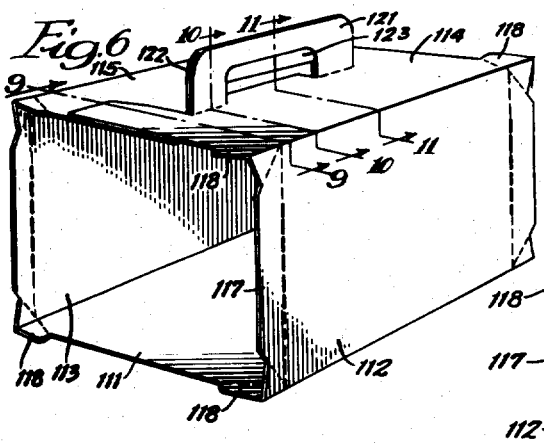
Figure 6 is a view similar to Figure 4 of a container formed with handles.
Figure 7:
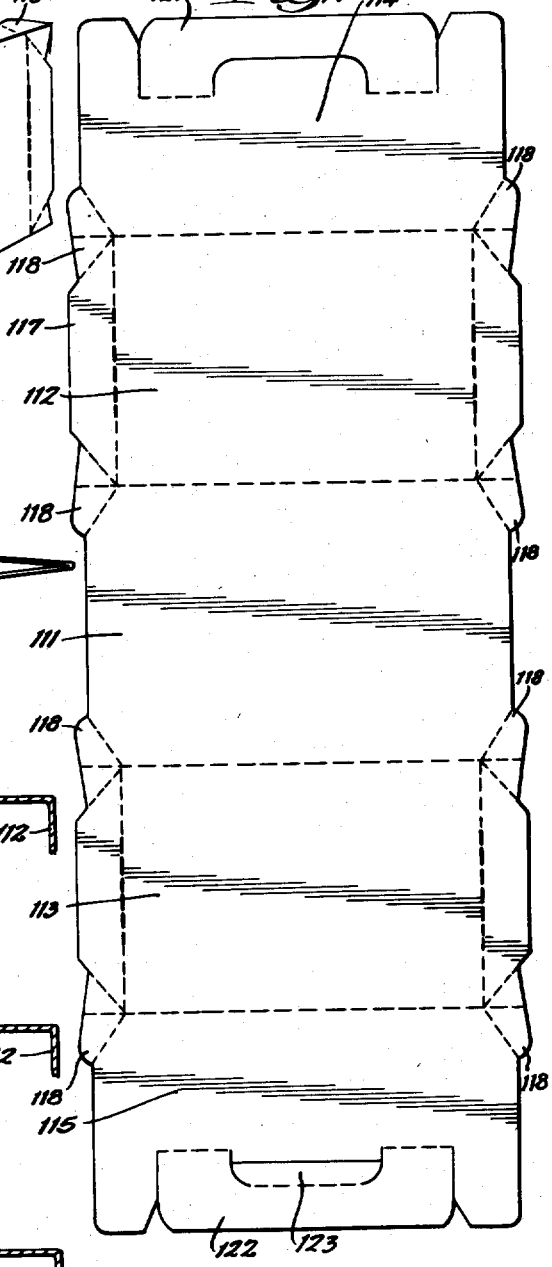
Figure 7 is an elevation of the blank from which the container of Figure 6 is formed.
Figure 9:
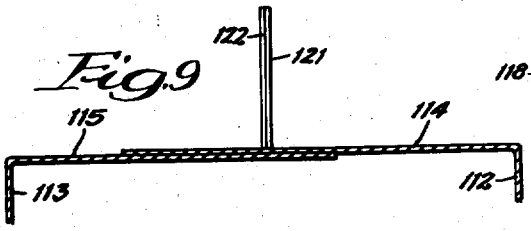
Figure 10:
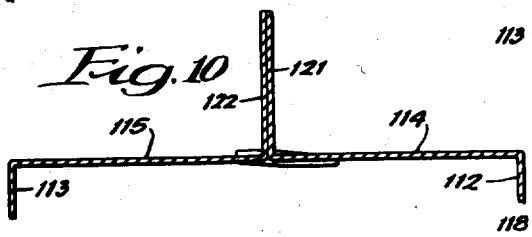
Figure 11:
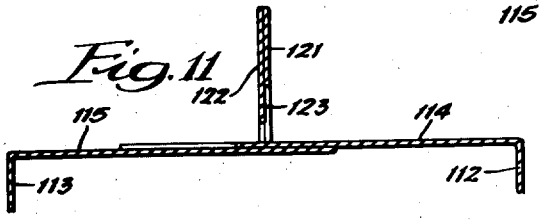
Figure 12:
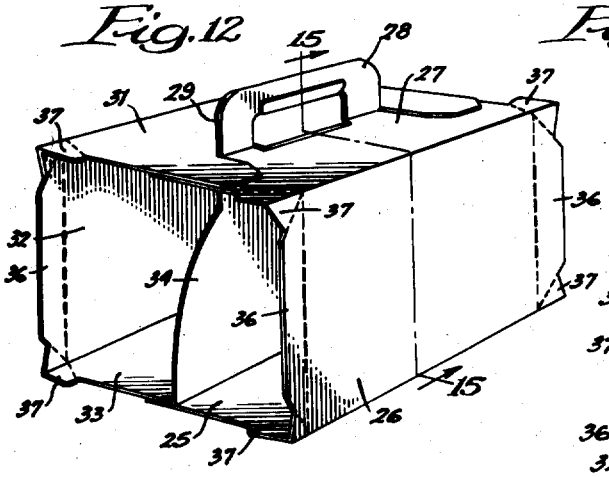
Figure 13:
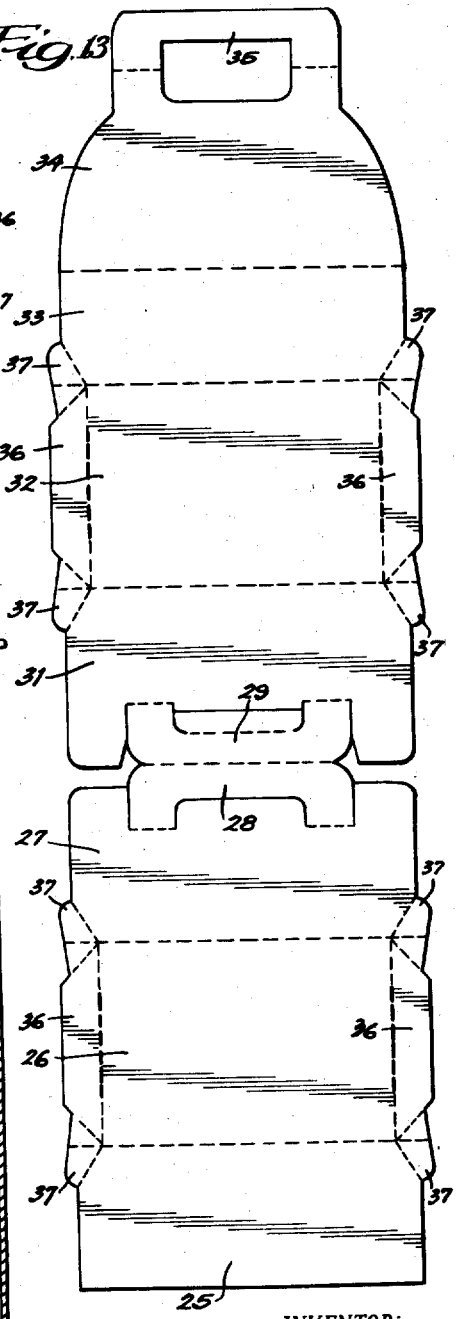
Figure 14:
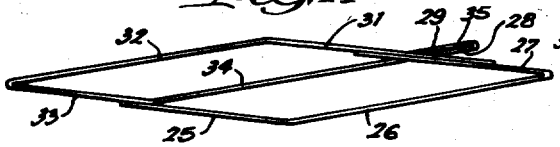
Figure 15:
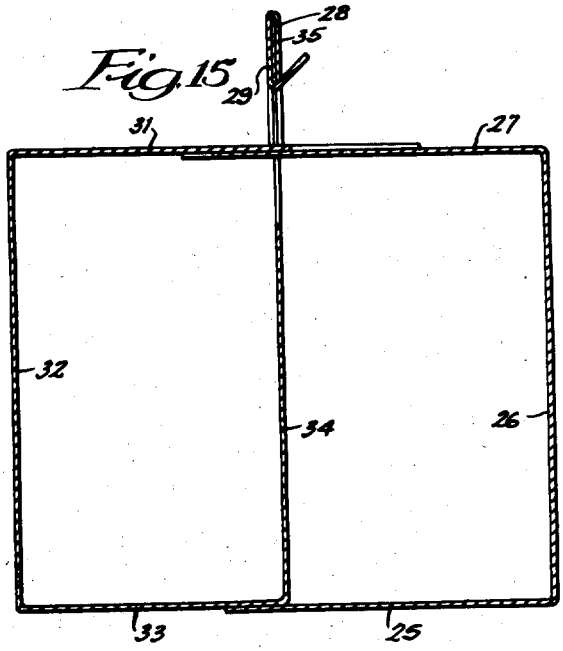

Figures 9, 10 and 11 are partial sections on the lines 9—9, 10—10 and 11—11, respectively, of Figure 6;

Figure 12 is a perspective view of a container embodying the invention provided with a central partition;

Figure 13 is an elevation of the blank from which the container of Figure 12 is formed;

Figure 14 is an end elevation of the container of Figure 12 in partially flattened condition; and Figure 15 is a section on the line 15—15 of Figure 12.

Figure 1:
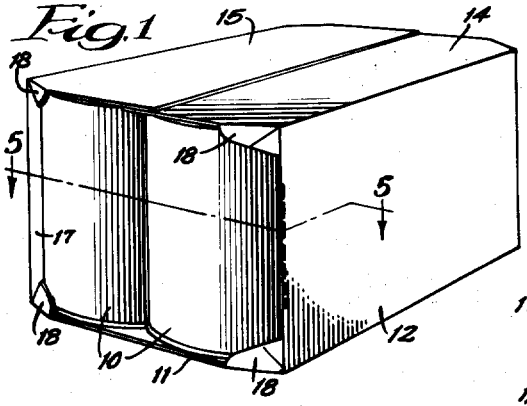
Figure 1 is a perspective view of a simple basic container embodying the invention.

The basic container, as shown in Figure 1, is adapted to hold a plurality of articles illustrated as right circular cylindrical cans 10 of the type in which various beverages are commonly packaged and sold. The container, as will be understood, may be made of any desired size to hold any desired number of cans or other articles in single or multiple rows. It will further be understood that the container of the invention is not limited to use with right circular cylindrical articles but can be used with cylindrical articles of octagonal, hexagonal or rectangular section equally well. As shown in the drawing, the container holds six cans in two side-by-side rows of three cans.

Figure 2:
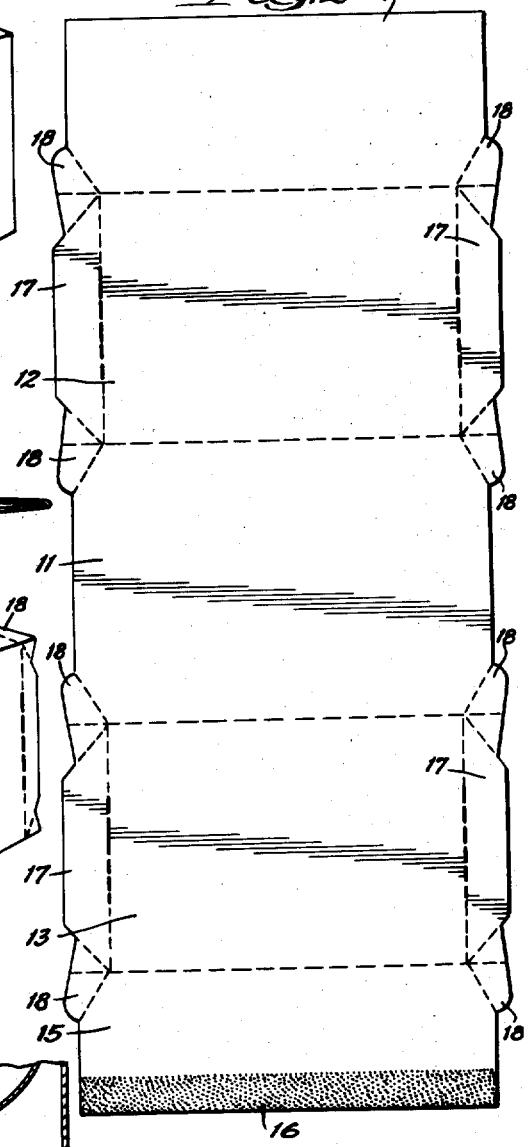
Figure 2 is an elevational view of the blank from which the container is formed.
Figure 3:
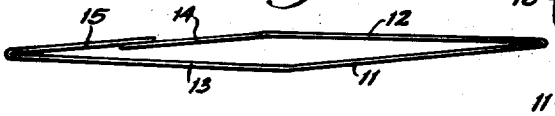
Figure 3 is an end view of the container in flattened condition for shipment or storage.
Figure 4:
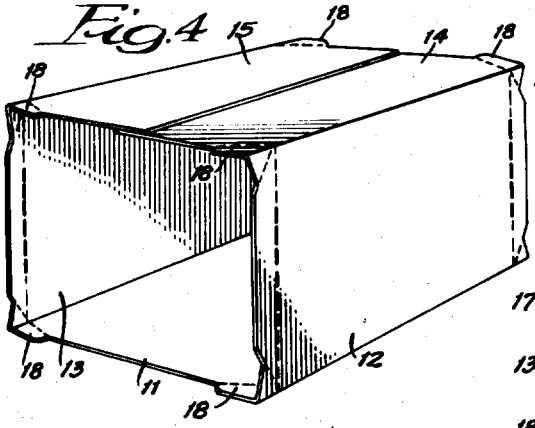
Figure 4 is a perspective view of the container erected ready for filling.

The container is formed of a single sheet of paper board, or the like, cut into a blank, as illustrated in Figure 2, to provide a bottom panel 11, side panels 12 and 13 and partial top panels 14 and 15. The top panels may be glued together by means of a line of adhesive 16 along the edge of one of the top panels which will overlap the edge of the other top panel, as seen in Figures 1, 3 and 4, to form a complete rectangular container with open ends. It will be noted that the container is formed with only a single glued seam which extends centrally across the top panel and serves to reinforce this panel as well as greatly simplifying the construction and erection of the container.

At the ends of the side panels 12 and 13 integral flaps 17 are provided which are foldably connected to the end panels to be folded in between the inner surfaces of the end panels and the articles in the container. To the ends of these flaps and to the ends of the adjacent top and bottom panels integral webs 18 are foldably connected and are preferably provided with central fold lines parallel to the folding joint between the side and top and bottom panels. It will be understood that in forming the blank the several parts are cut out as shown in the outline and that the several fold lines between adjacent panels and between the panels, the flaps and the webs are scored for easy folding.

The containers can be shipped either glued or unglued in flat condition to the point of filling and can be filled while glued or can be glued during filling, as desired. Figure 3 illustrates the partially flattened condition of the container with the edges of the top panel portions overlapping and with the side panels folded flat against each other. In this condition in which the containers are shipped and stored, the flaps and webs lie in the planes of the panels in flat condition, as shown in Figure 3.

To fill the container, it is erected as illustrated in Figure 4 with the flaps and webs still lying in the planes of the panels and projecting outward from the ends of the container so that the cans 10 or other articles can easily be inserted in the ends of the container. When the container is filled, the flaps 17 are folded in to lie between the container and the articles therein, as clearly shown in Figure 5. This operation can easily be performed even while the articles are in the container since the flaps will bend around and pass between the side panels and the articles. When the flaps are so folded, the webs 18 extend across the corners of the container and engage the end and side portions of the articles in the container to hold them against accidental removal. It will be noted that the flaps and webs require very little material and are secured in holding condition without the necessity of any gluing or other fastening so that the container is extremely inexpensive and can easily be filled.

Figure 5:
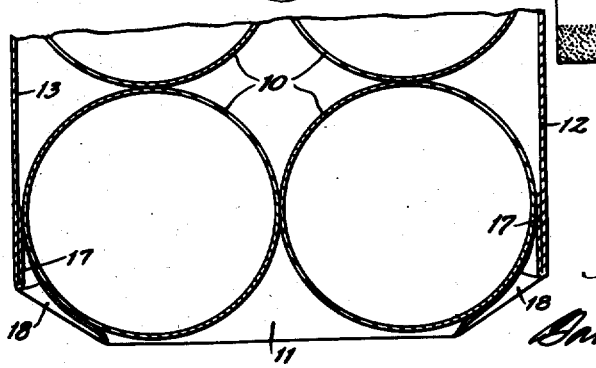
Figure 5 is a partial section on the line 5—5 of Figure 1.

With the flaps folded in, as shown in Figures 1 and 5, the articles are securely held against accidental removal through the ends of the container in all normal storage and handling operations. When it is desired to remove the articles the flaps 17 can be pulled out by hand with relatively little effort to open the ends of the container completely so that the articles can easily be taken therefrom.

Figures 6 to 11 illustrate a modification of the construction of Figures 1 to 5 wherein a reinforced handle is provided at the top of the container for easy carrying. The several parts in Figures 6 to 11 corresponding to like parts in Figures 1 to 5 are indicated by the same reference numerals plus 100.

In this construction, the ends of the top panel portions 114 and 115 are formed with handle cut-outs 121 and 122 of generally U-shape foldably connected to the panel portions. In cementing the panel portions together one of the handle cut-outs is folded back over the top of its adjacent panel and its inner surface is cemented to the inner surface of the opposite handle portion at the same time that the edges of the panel parts are cemented together. In this way a U-shaped handle is formed which is foldably joined to the center of the top panel and which is of double thickness for strength. If desired, one of the handle portions shown as 122 may be formed with an inwardly extending flap 123 which can be folded under the raw edges of the handle portions to provide a smooth gripping surface for gripping with the fingers and for additional strength.

Figure 8:
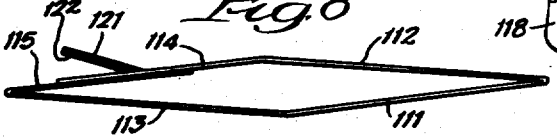
Figure 8 is an end view of the container of Figure 6 in flattened condition.

The container of Figures 6 to 11 may be shipped and stored in flatttened condition, as illustrated in Figure 8, which shows the container partially folded. In this condition the handles will lie flat against one side of the top panel and the side panels will lie parallel to each other in face-to-face relation. The container can be erected and filled in the same manner as the container of Figures 1 to 5 and in the filled container the handles may be folded flat against the top panel, if desired, to save space in storage or shipment.

Figures 12 to 15 illustrate still another embodiment in which the container is formed with a central divider panel to separate adjacent rows of articles. This construction is formed from a single integral blank of paper board, or the like, as shown in Figure 13, which is cut and scored to provide a bottom panel portion 25 foldably connected to a side panel 26 which is in turn foldably connected to a top panel portion 27. The top panel portion is provided with a handle cut-out 28 foldably joined to a handle cut-out 29 at an adjacent top panel portion 31. The top panel portion 31 is foldably joined to a side panel 32 which is in turn foldably joined to the remaining bottom portion 33. The bottom panel portion 33 is foldably joined to a central divider panel portion 34 which is formed at its end with a narrow handle cut-out 35.

To assemble this container the bottom panel portion 25 is folded around to connect to the bottom panel portion 33 adjacent to the fold line between the panel portion 33 and the central divider panel 34. The central divider panel 34 is folded to lie between the side panels 26 and 32 with the handle portion 35 extending between the handle portions 28 and 29. The three handle portions are cemented together and the extensions at the side of the handle portions 28 and 29 on the top panel portions 27 and 31 are overlapped and cemented together. This completes assembly of the container with cementing only at two places centrally of the top and bottom panels.

In assembled condition, the container can be folded flat, as indicated in Figure 14, for easy shipment and storage and can be erected to the position shown in Figure 12 for filling. When folded, the handle will fold flat against the top panel so that it occupies a minimum of space and can even be folded flat against the top panel after the container is erected for shipment and storage.

The ends of the side panels 26 and 32 are formed with foldable flaps 36 and foldable webs 37 similar to the webs 18 or 118 are foldably joined to the ends of the flaps and the ends of the adjacent top and bottom panels. When the container is filled the flaps 36 are folded in between the side panels and the articles in the container in the same manner as in Figures 1 to 11 so that the webs 37 will extend across the corners of the container open ends to hold the articles therein against accidental removal. In this construction, however, the articles are separated by the central dividing panel 34 which also substantially increases the strength of the carrier.

While three embodiments of the invention have been shown and described herein, it will be understood that they are illustrative only and not to be taken as a definition of the scope of the invention, reference being had for this purpose to the appended claims.

What is claimed is:

1. In combination, a carton and a plurality of cylindrical articles, said carton being formed of paper board or the like with interconnected top, bottom and side panels defining an open ended container in which the articles are received in side by side relationship, a foldable flap foldably joined to the end of at least one of the panels along a fold line spaced from and generally parallel to the end of the panel to fold back into the container between said one of the panels and an adjacent one of the articles in the container, and a web formed of a pair of generally triangular sections foldably joined to each other along a central fold line and foldably joined to one end of the flap and to an adjacent panel along angularly related fold lines, all of the fold lines meeting at a common point at one corner of the carrier and the web extending across a corner of the open end of the container and contacting an end edge portion of the adjacent article to prevent accidental removal of articles from the container.

2. In combination, a carton and a plurality of cylindrical articles, said carton comprising an elongated sheet of paper board or the like having its ends overlapping and secured together and defining an open ended container having foldably joined top, bottom and side panels, the connection between the ends of the sheet lying centrally of one of the panels, the articles being held in side by side relationship in the container, integral flaps foldably joined to the ends of certain of the panels along fold lines spaced from and generally parallel to the ends of the panels to fold back into the container between the panels and adjacent ones of the articles in the container, and integral webs each formed of a pair of generally triangular sections foldably joined to each other along a central fold line and foldably joined to the ends of the flaps and to the ends of adjacent panels along angularly related fold lines, all of the fold lines meeting at a common point at one corner of the carrier, and the webs extending across the corners of the open ends of the container and contacting the end edge portion of the adjacent article.

3. In combination, a carton and a plurality of cylindrical articles, said carton comprising an elongated sheet of paper board or the like defining foldably connected top, bottom and side panels defining a container with open ends in which the articles are received in side by side relationship, cut-out handle extensions at the ends of the sheet foldably secured thereto, the ends of the sheet overlapping and being secured together centrally of the top panel with the handle extensions being secured together face-to-face and foldable away from the top panel, integral flaps foldably connected to the ends of certain of the panels to fold back into the carrier between the panels and articles in the container, and integral webs formed of a pair of generally triangular sections foldably joined to each other along a central fold line and foldably connected to the ends of the flaps and the ends of adjacent panels along angularly related fold lines, all of the fold lines at each end of the flap meeting at a common point at one corner of the carrier and the web extending across the corners of the open ends of the container and contacting the end edge portion of the adjacent article.

4. In combination, a carton and a plurality of cylindrical cans, said carton having a first body wall for supporting a plurality of cans in upright position, a second body wall articulated to said first named body wall and extending at right angles thereto for contact by the sides of the cans supported on said first body wall, and a third body *wall* articulated to said second body wall and overlying the tops of said cans, said body walls having a length substantially equal to the combined cross sectional dimensions of the cylindrical cans so that the outermost edges of the end cans in the carton coincide substantially with the end edges of the body walls, a score line in said second body wall extending parallel to and spaced from an end edge thereof to define a flap, a pair of angularly related lines of fold at each end of said flap having a common point of juncture at the end of said line of fold, the first diagonal fold line of each pair being formed in said flap and extending diagonally outwardly from said common point of juncture to the free edge of said flap, the remaining score lines in each pair being formed, one each, in said first and third body walls and extending outwardly from said common points of juncture to the free ends of said body walls, said pairs of angularly related lines of fold defining generally triangular saddle members adapted to be deflected from the planes of the walls in which they are formed upon infolding of the said flap to define saddles bridging the ends of the body walls and contacting end edge portions of the endmost can supported on said first body wall.

*5. In combination, a carton and at least one cylindrical article, said carton being formed of sheet material with top, bottom and side panels defining an open ended sleeve in which at least one cylindrical article is received, a flap foldably joined to at least one of the panels at the open end of the sleeve along a fold line spaced from and extending in the general direction of the end of the panel and foldable back into the sleeve between said one of the panels and the adjacent portion of an article in the sleeve, and a web formed of a pair of generally triangular sections foldably joined to each other along a central fold line and foldably joined to one end of the flap and to the end of an adjacent panel along angularly related fold lines, all of said fold lines meeting at a common point at one corner of the carton and one section of the web extending across a corner of the open end of the sleeve and contacting the adjacent end edge portion of an article in the sleeve to prevent removal of the article from the sleeve.*

*6. In combination, a carton and at least one cylindrical article, said carton being formed of sheet material with top, bottom and side panels defining an open ended sleeve in which at least one cylindrical article is received, a flap foldably joined to at least one of the panels at the open end of the sleeve along a fold line spaced from and extending in the general direction of the end of the panel and foldable back into the sleeve between said one of the panels and the adjacent portion of an article in the sleeve, a generally triangular web foldably joined to one end of the flap along a fold line at an acute angle to the first named fold line, a generally triangular gusset foldably joined at one edge to the end of an adjacent panel along a fold line angularly related to the last named fold line and to the web along a fold line generally aligned with the fold line between said one of the panels and said adjacent panel, all of said fold lines meeting at a common point at one corner of the carton and said gusset extending across a corner of the open end of the sleeve and contacting the adjacent end edge portion of an article in the sleeve to prevent removal of the article from the sleeve.*

References Cited in the file of this patent or the original patent

UNITED STATES PATENTS

| | | |
|---|---|---|
| 2,314,895 | Powell | Mar. 30, 1943 |
| 2,523,985 | Foster | Sept. 26, 1950 |
| 2,713,451 | Williamson et al. | July 19, 1955 |